No. 784,335. PATENTED MAR. 7, 1905.
C. LAURICK.
CASH REGISTER.
APPLICATION FILED JUNE 5, 1900.
7 SHEETS—SHEET 1.
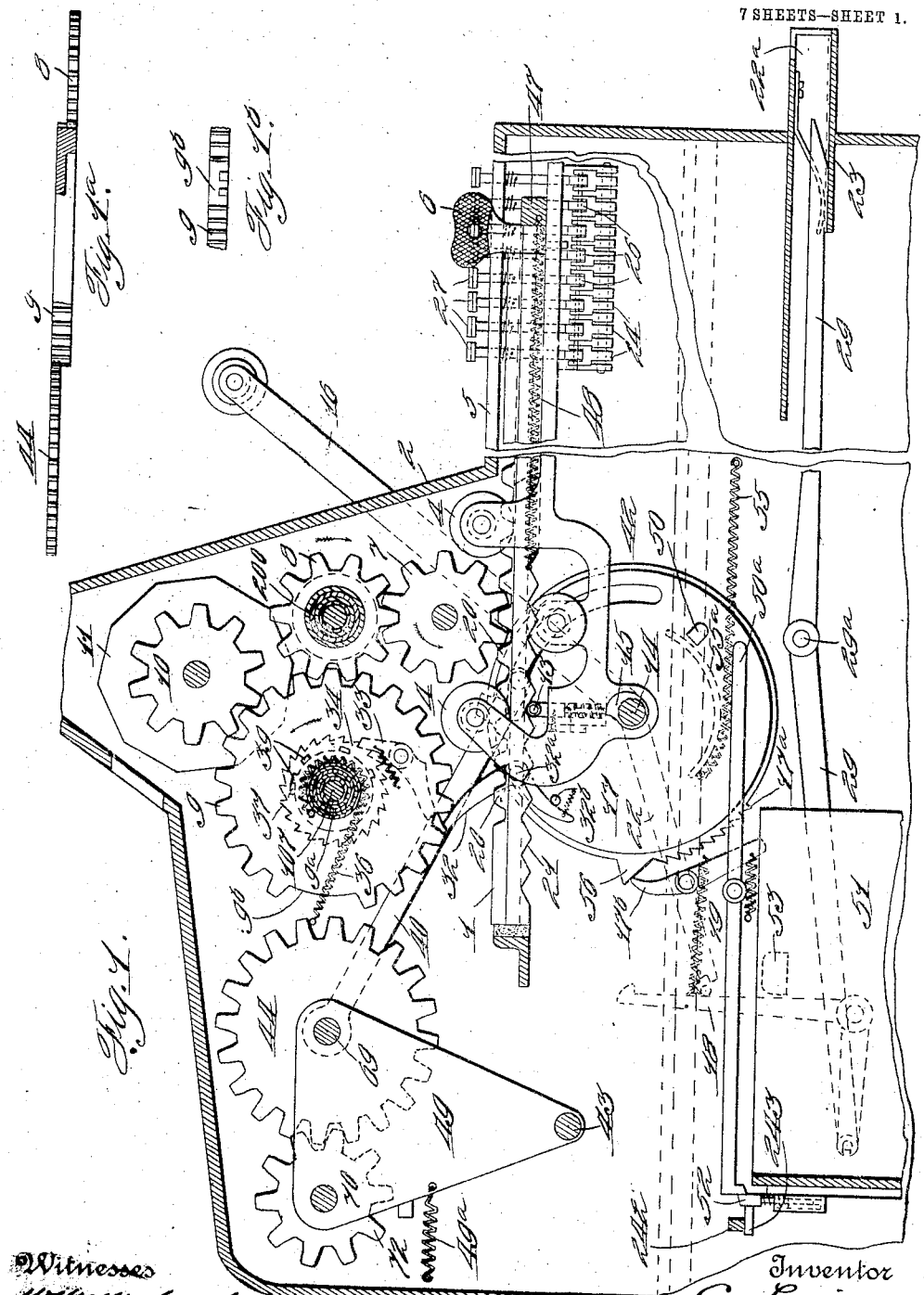
Witnesses
Inventor
Attorney

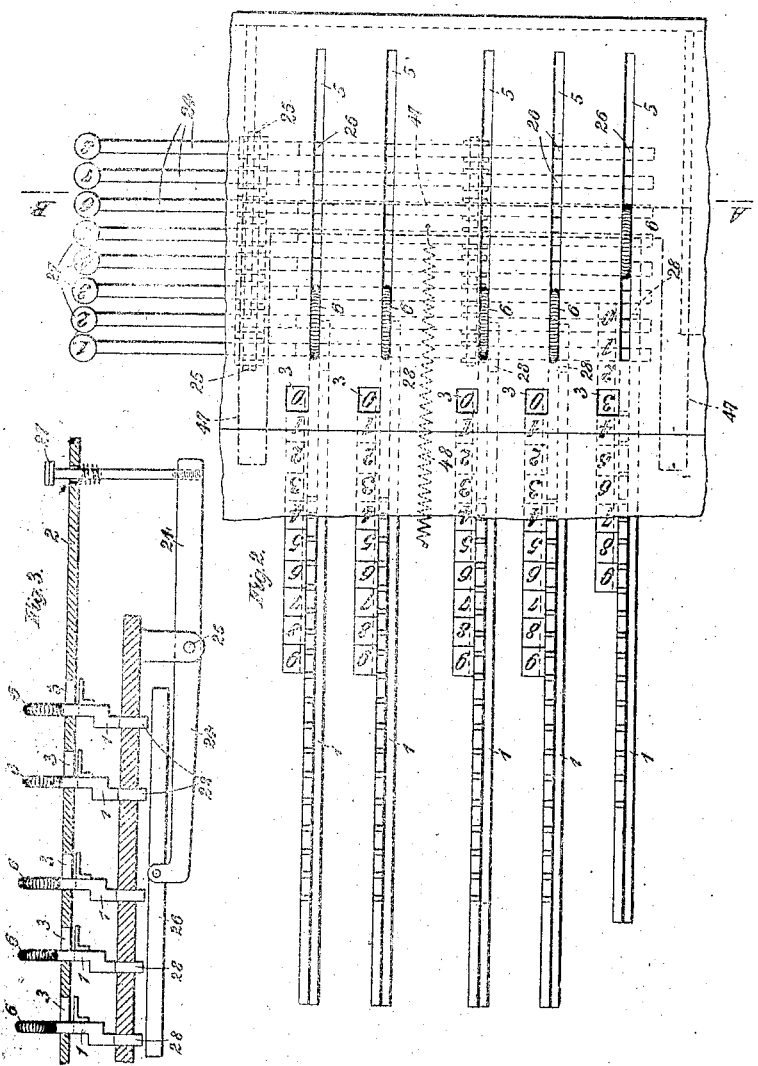

No. 784,335. PATENTED MAR. 7, 1905.
C. LAURICK.
CASH REGISTER.
APPLICATION FILED JUNE 5, 1900.
7 SHEETS—SHEET 3.
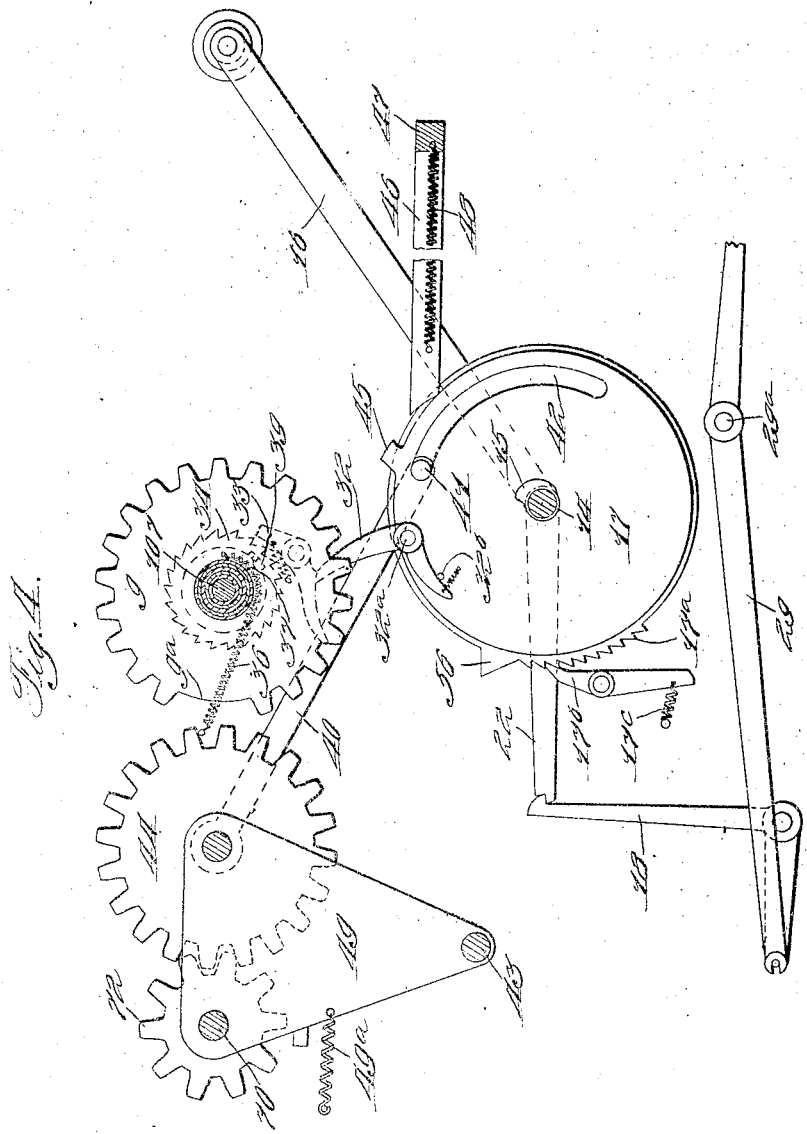
Witnesses
Inventor
Attorney

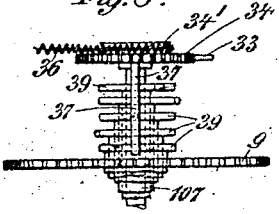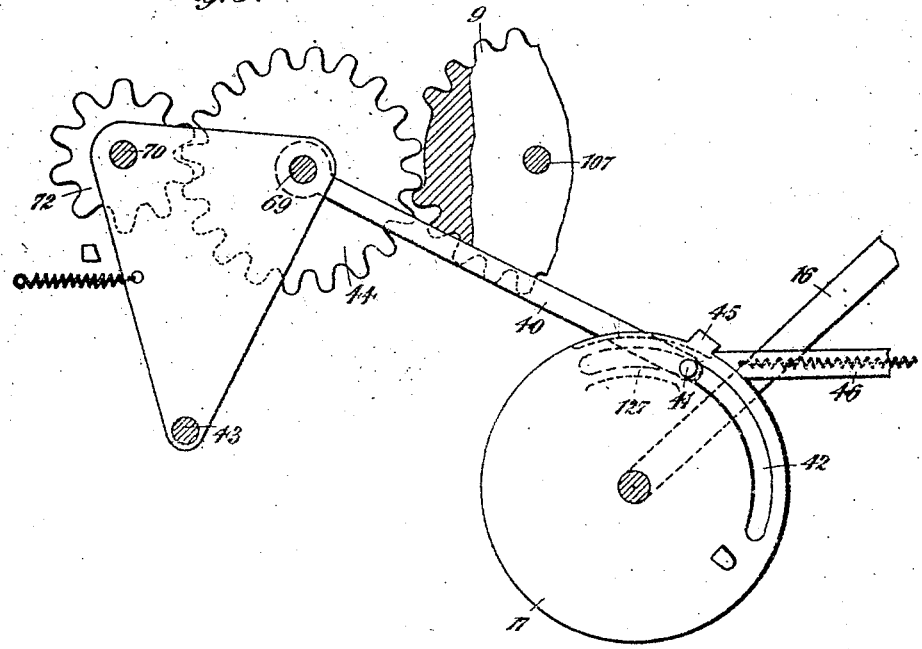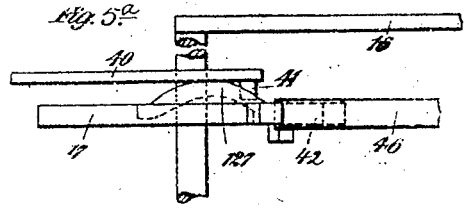

No. 784,335. PATENTED MAR. 7, 1905.
C. LAURICK.
CASH REGISTER.
APPLICATION FILED JUNE 5, 1900.
7 SHEETS—SHEET 5.
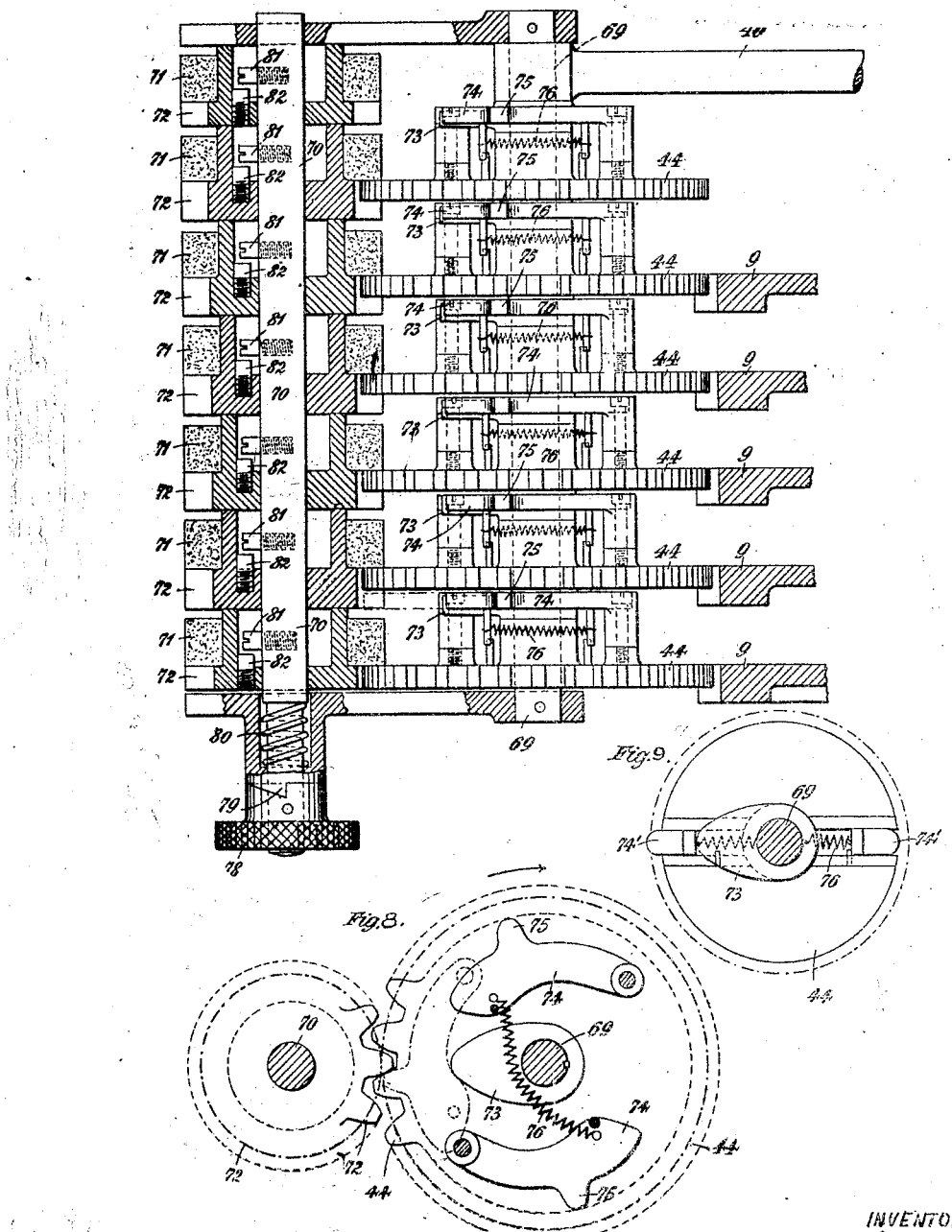

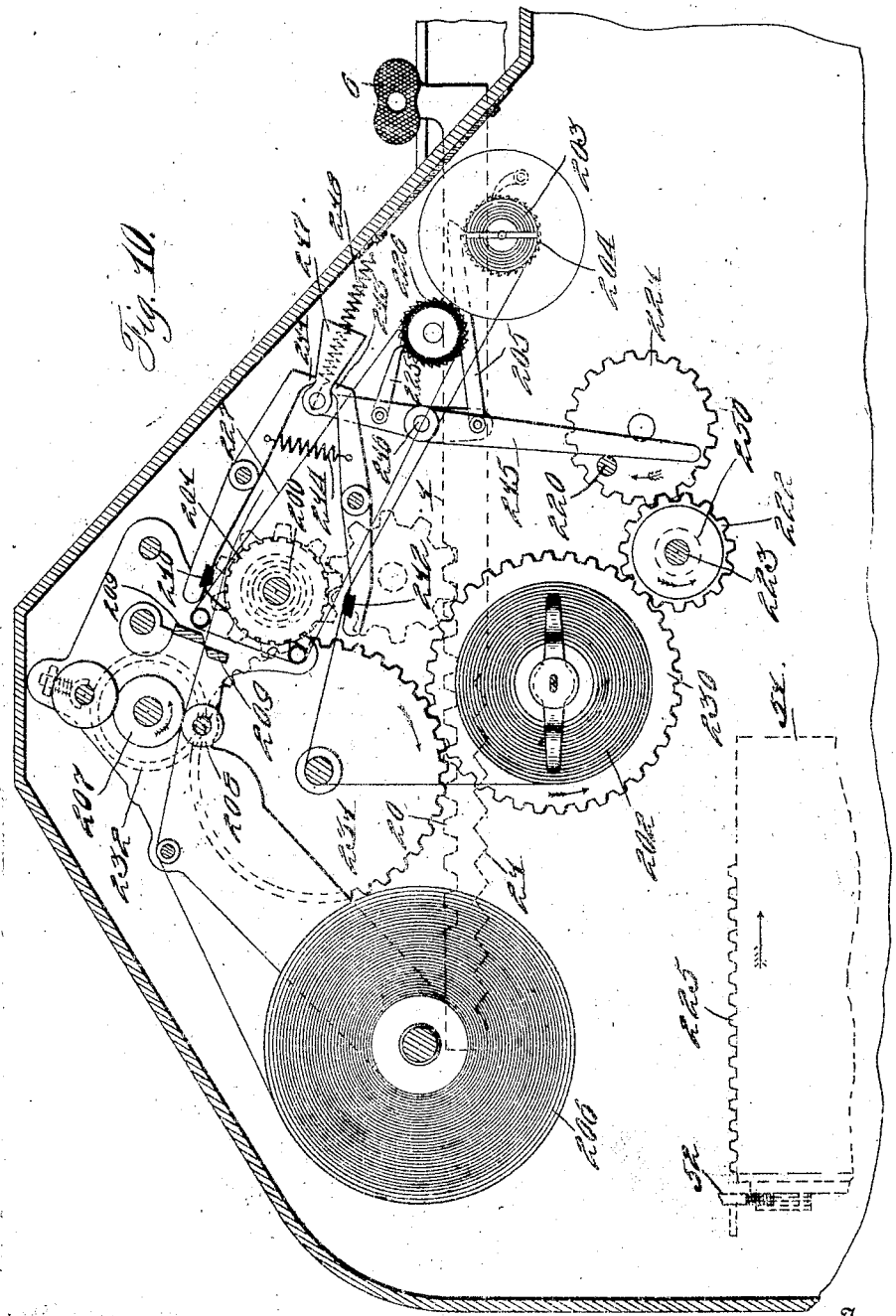

No. 784,335. PATENTED MAR. 7, 1905.
C. LAURICK.
CASH REGISTER.
APPLICATION FILED JUNE 5, 1900.
7 SHEETS—SHEET 7.
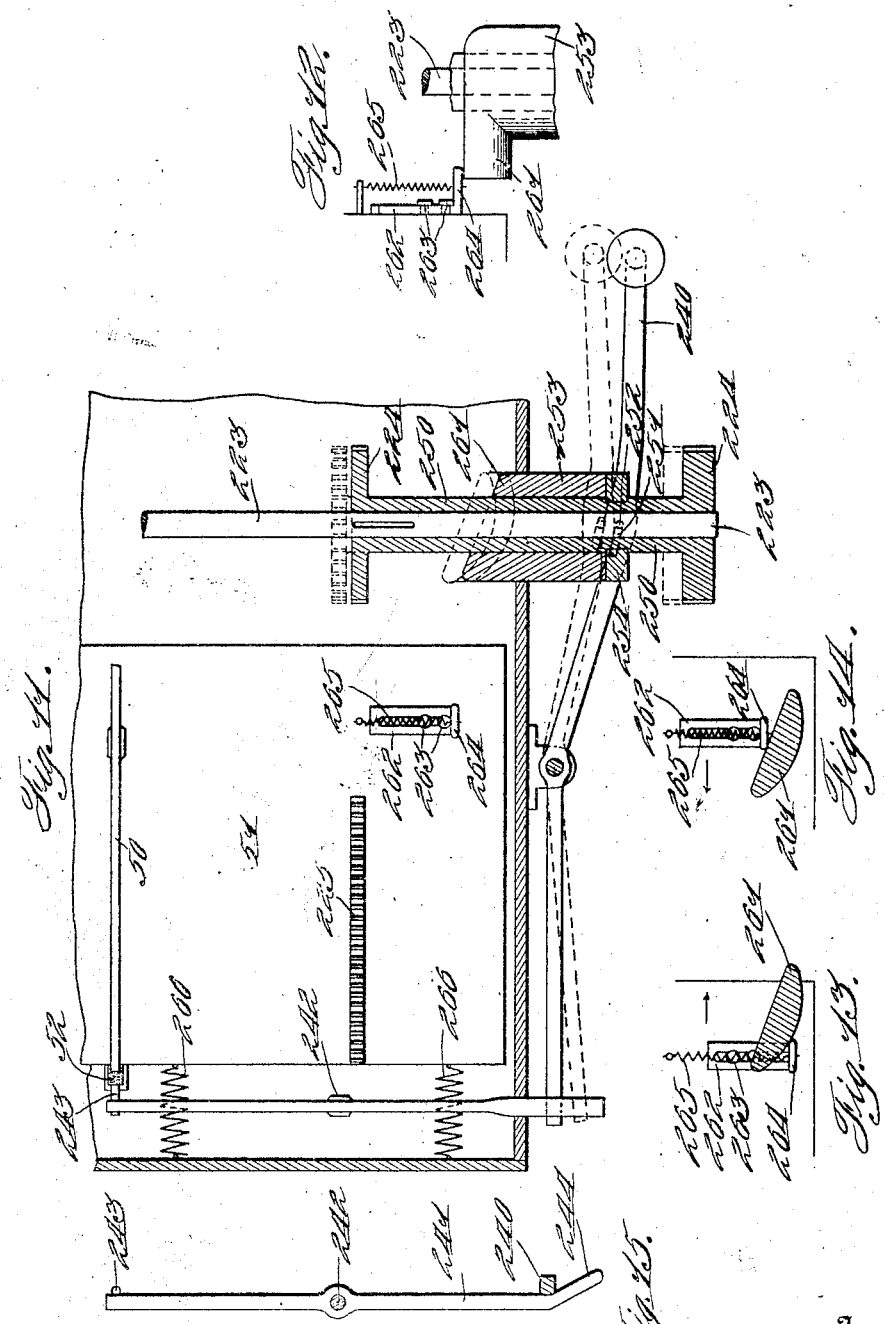

No. 784,335. Patented March 7, 1905.

UNITED STATES PATENT OFFICE.

CARL LAURICK, OF BERLIN, GERMANY, ASSIGNOR TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 784,335, dated March 7, 1905.

Application filed June 5, 1900. Serial No. 19,093.

*To all whom it may concern:*

Be it known that I, CARL LAURICK, a subject of the King of Prussia, German Emperor, and a resident of Berlin, in the Kingdom of Prussia, German Empire, have invented certain new and useful Improvements in Cash-Registers, of which the following is a specification.

The present invention relates to improvements which are applicable to various forms of cash-registers; but certain of the improvements are more particularly applicable to cash-registers of the so-called "two-motion" type, in which a series of setting elements are first adjusted and then the subsequent operation is completed by means of the movement of an operating member; and it is among the objects of this invention to provide in such machines an improved device for returning the setting elements to normal position and also to provide certain novel locking devices for the operating member.

With these and incidental objects in view the invention consists in certain novel features of construction and combinations of parts, the essential elements of which are set forth in appended claims and a preferred form of embodiment of which is hereinafter specifically described with reference to the drawings which accompany and form part of this specification.

Of said drawings, Figure 1 represents a vertical section of the machine. Figs. 1ª and 1ᵇ represent detail views of portions of the gears for operating the counters. Fig. 2 represents a top plan view of the keyboard. Fig. 3 represents a vertical section on the line A B of Fig. 2, showing the stop mechanism for setting the key-slides. Fig. 4 represents a detail elevation of certain parts of the mechanism for returning the setting-slides to normal position and also represents in detail certain of the locking features. Figs. 5 and 5ª represent detail views of the device for throwing the counter into operative position. Fig. 6 represents a detail view of a portion of the mechanism for resetting the setting-slides to normal position. Fig. 7 represents a sectional view of the counter mechanism. Figs. 8 and 9 represent detail views of the transfer mechanism, Fig. 9 being a modified form. Fig. 10 represents an end elevation of the printing mechanism. Fig. 11 represents a top plan view of the cash-drawer and connections for operating the printer. Figs. 12, 13, 14, and 15 represent detail views of certain portions of the mechanism shown in Fig. 11.

As stated above, certain of these improvements are applicable to any of the various forms of cash-registers; but the particular machine to which the present improvements have been applied is a machine of the two-motion type, and for the sake of a general understanding of the operation of this machine a brief description will first be given of its general mode of operation. There are a series of key-slides which are adjustable to a plurality of different setting positions to represent the different amounts to be registered, these slides being normally locked in their previously-adjusted position until the operating-handle is moved to a certain extent. When the handle has thus been moved to this particular extent, the key-slides are unlocked and automatically return to normal zero position from their previously-displaced positions and the handle is unlocked to permit its further movement by the insertion of a check into a certain portion of the machine. The handle is then moved forward another degree of movement, during which movement the counter is brought into operative position, and the handle is locked at the end of this second period of movement by reason of the fact that all of the setting-slides now occupy their normal zero positions, so that upon the operation of any key-slide from its zero position the handle is unlocked to permit further movement, the movement of the key-slide being transmitted directly to the counter, so as to add on the counter by the movement of the slide, and as soon as the proper amounts have been set up by the key-slides and thereby added upon the counter the operating-handle is now moved to the limit of its movement in this one particular direction and is thereupon latched from return to normal position until the cash-drawer is moved from its normal position within the casing of the machine, whereupon the operating-handle is automatically released and springs back to normal position, thereby locking all of the key-slides in set position. The opening of the drawer is also arranged to actuate the printing mechanism, and separate means are provided for opening the drawer without operating the machine and for simultaneously preventing the drawer from operating the printer at the time of such independent opening of the drawer. With this brief description of the general mode of operation of this machine the specific mechanism will now be described in detail.

The key-slides 1 (see Figs. 1, 2, and 3) are mounted to slide within the casing of the machine, being guided on their upper sides by rollers 4, and to the outer end of each key-slide is attached a button 6, which extends through a slot 5, formed in the casing 2, these various buttons being arranged to be grasped by the hand of the operator for the purpose of adjusting the slides to their proper setting position. The upper surface of each slide is provided with a series of numerals from "0" to "9," which are arranged to be displayed through sight-openings 3, (see Fig. 2,) formed in the casing 2, so that the operator may see that the slide is set to the proper amount. The upper side of each slide 1 is formed with registering teeth 20 and the lower side with alining teeth 21. In order to assist in the setting of the slides to proper position, a series of auxiliary keys 27 are provided, (see Figs. 2 and 3,) which keys bear numerals from "1" to "8," inclusive, and are attached at their lower ends to levers 24, pivoted to brackets at 25 and carrying on their inner ends stop-bars 26, these keys and their respective stop-bars being differentially spaced with reference to the forward ends of the key-slides 1, so that when any particular key 27 is depressed its corresponding bar 26 will be raised into the path of the end of the key-slide 1, so that when the key-slide is moved forward from normal position the end of the key-slide will abut against the stop-bar 26, and thereby the key-slide will be arrested in proper setting position corresponding to the numeral on the key 27, and of course for the setting of the slide 1 to its "9" position no auxiliary key is necessary, since the key-slide is moved to its extent of movement until it strikes the casing or other suitable abutment. The aforesaid teeth 20 of each key-slide mesh with respective pinions 7, which pinions in turn mesh with pinions 8, which mesh with larger gear-wheels 9, which are mounted to rotate upon the shaft 107, so that the movement of the slides 1 outward from normal position will rotate the gear-wheels 9 in the direction shown by the arrow in Fig. 1. The gear-wheels 9 mesh with respective pinions 10, to which are attached indicators 11 for indicating to the purchaser the amount set up on the key-slides.

The alining teeth 21 of the slides 1 are engaged by alining plungers 13, suitably spring-seated in a cross-bar extending below the key-slides, and the lower ends of these plungers are engaged by a cam-shaft 15, which forms a portion of the transverse shaft 14, to which the operating-handle 16 is made fast, and from the position of the cam-shaft and operating-handle as shown in Fig. 1, which is the normal position of the operating-handle, it will be observed that the cam-shaft holds the alining plungers 13 up against the key-slides, so as to lock the same from movement in either direction; but as soon as the operating-handle is slightly moved the shape of the cam-shaft is such as to free the lower ends of the alining plungers and permit the key-slides to move.

Fast upon the transverse shaft 14 is an operating-disk 17, which performs certain functions, to be later described.

Pivoted to the casing of the machine, in the rearward portion thereof, is a bell-crank lever 18, upon the upper end of which is a locking-nose, and this upper end is spring-drawn forward by a spring 19 to engage a locking-arm 22, which is made fast to the lower pivotal end of the operating-handle 16. Thus it will be seen that when the operating-handle 16 is given an initial movement from normal position it will at the end of this initial movement be locked by the contact of an arm 22 against the locking-nose of the lever 18, during which movement, however, the alining plungers 13 are freed from the cam-shaft 15 to unlock the key-slides 1. Attached to the rear end of the lower arm of the bell-crank lever 18 is a lever 29, which is pivoted at its middle portion 29ª to the side frame of the machine and the forward end of which lever normally rests upon a plate 23, access to which plate is had through an opening 22ª, formed in the casing, through which opening a ticket may be inserted into the position shown in the dotted line, Fig. 1, just above the plate 23, and when a ticket is thus inserted between the plate 23 and the lever 29 the forward end of the lever 29 will of course be raised, and the lowering of its rearward end will obviously rock the upper end of the bell-crank lever 18 rearward, thus unlocking its nose from contact with the locking-arm 22, and thus permitting the operating-handle 16 to be moved forward. The ticket which is thus used to unlock the machine may be any suitable paper check upon which items of the transaction are written or, if desired, upon which certain items are printed by the printing mechanism of the machine, and any ordinary form of ejector mechanism may be used to move the ticket into a locked receptacle below at each operation of the machine. This second position of the operating-handle 16, where it is locked by the lever 18, is shown in Fig. 4. In order to prevent the backward turning of the handle after it has been started forward, the disk 17 is provided upon its rearward periphery with arrester-teeth 17$^a$, which are engaged by an arrester-pawl 17$^b$, suitably pivoted at its middle portion to the side frame of the machine and drawn into engagement with the teeth 17$^a$ by the spring 17$^c$.

The mechanism for restoring the setting-slides to normal position after their previous adjustment will now be described.

Each of the gears 9 is fast upon a nested sleeve 9$^a$, (see Fig. 1,) and, as shown in Figs. 1 and 6, the lateral extensions of these nested sleeves have projecting outwardly from them pins 39, which are arranged to be engaged by a horizontally-extending restoring-pin 37, which projects laterally from a ratchet-disk 34, mounted loosely upon the shaft 107, to the side of which disk is made fast a grooved wheel 34', upon which a spring 36 is arranged to be wound up, one end of this spring being attached to the wheel 34' and the other end to the frame of the machine. The ratchet-disk 37 is engaged by a pawl 33, suitably pivoted to the main frame and spring-drawn into engagement with said ratchet-disk, the lower end of said pawl 33 being arranged to be engaged by a tripping-pawl 32, which is pivoted to the aforesaid disk 17 at 32$^a$ and is normally spring-drawn against a stop-pin 32$^b$. When any one of the setting-slides 1 is moved from normal position, the corresponding movement of the gear-wheel 9 will cause the finger 39, attached to its corresponding nested sleeve, to rotate in the direction shown by the arrow in Fig. 1, and the contact of the finger 39 with the restoring-bar 37 will consequently move the ratchet-disk 34 in the same direction, thereby rotating the ratchet-disk 34 and winding up the spring 36 on its grooved wheel 34'. The ratchet-disk is held in this operated position by the engagement of a pawl 33 with the teeth of the ratchet. The normal position of the ratchet-disk 34 and the restoring-pin 37 and the fingers 39 is shown in Fig. 4, which is the position prior to the movement of any setting-slide, and the operated position is shown in Fig. 1, in which one of the slides has been moved to such an extent as to cause its corresponding finger 39 to move the restoring-pin 37 into the position shown in said figure, with the fingers 39 of the other slides remaining in intermediate positions. As soon as the operating-handle 16 has been moved to its second position, as shown in Fig. 4, the tripping-pawl 32 engages the pawl 33 and moves the same from engagement with the ratchet-disk 34, thereby freeing the same to permit the spring 36 to retract it to normal position, and in this return to normal position the restoring-pin 37 comes successively in contact with the various fingers 39, which have been moved to the positions indicated in Fig. 1, and thereby restores all of said fingers, and therefore all of the setting-slides 1, to normal position. The operating-handle 16 now having been turned to its second position and the setting-slides returned to normal zero position, as above explained, the handle is unlocked by means of the insertion of the ticket, as previously described, and the handle is moved to its third position, in which the disk 17 assumes the position shown in Fig. 5. At this point there is still another locking of the handle from continued movement, this being caused by the contact of a lug 45 with the rearwardly-extending arm 46 of a yoke-frame having a cross-bar 47, which extends across the forward ends of all of the key-slides, said frame being normally drawn rearward by means of a spring 48, and the position of the arm 46 being such that when all of the setting-slides are at normal zero position and the yoke-frame is consequently at this normal rearward position the rearward end of the arm 46 will lie in the path of the lug 45, so as to lock the operating-handle at its third position, as just described. At this third position, however, the tripping-pawl 32 has been moved past the ratchet-pawl 33, so as to permit the latter pawl again to engage the ratchet-disk 34, so that when the setting-slides are now moved from normal position the ratchet-disk 34 will be held in the position to which it is moved, although, of course, the setting-slides can be moved backward toward normal position in case they have been inadvertently moved too far. It will be observed from the position of the cross-bar 47 as shown in Figs. 1 and 2 that this movement of a setting-slide from zero position will carry the yoke-frame backward, and thereby retract the arm 46 from engagement with the locking projection 45, and therefore unlock the operating-handle 16 from this third position. During this movement of the operating-handle from its second to its third position the counter is thrown into position to be operated by the various setting-slides during their movement from normal position to the desired setting position. The counter-wheels comprise a series of gear-wheels 72, (see Figs. 1, 4, and 5,) mounted to turn upon a shaft 70, and these gear-wheels 72 mesh with intermediate gears 44, mounted to turn upon a shaft 69. The entire set of counter-wheels 72 and intermediate gear-wheels 44 are mounted in an oscillating frame 49, which turns upon a transverse shaft 43. Pivoted to the shaft 69 is a link 40, upon the lower end of which is a laterally-projecting pin 41, which projects into a slot 42, formed in the aforesaid disk 17. As shown in Fig. 1, the length of the slot 42 is such that when the operating-handle 16 is in normal position there is some free space between the pin 41 and the upper end of the slot 42, and as soon as the operating-handle has been moved to its second position this upper end of the slot is just ready to engage the pin 41, as shown in Fig. 4, and as soon as the handle has been moved to its third position the pin 41 is now drawn downward, thereby causing the link 40 to rock the counter-frame 49 downward, so that the various intermediate gears 44 are brought into engagement with their respective gear-wheels 9, this engagement taking place when the setting-slides and the gear-wheels 9 are at normal position, at which point the gear-wheels 44 move forward into cut-away portions 9<sup>b</sup>, formed in the gear-wheels 9. This position, in which the counter is thrown into operation, is shown in Fig. 5. It is therefore obvious that when the setting-slides are now moved the movement of the gear-wheels 9 will cause a corresponding movement of the counter-wheels 72 through the intermediate gears 44, and therefore the registration will take place upon the counter by the movement of the setting-slides. The construction of the counter will be set forth in detail later. The setting-slides having been moved to the desired setting position and the operating-handle 16 unlocked from its third position, as previously explained, the handle is now moved to the extremity of its downward position, whereupon a lug 50, formed upon the side of the disk 17, strikes the forward end of a lever 50<sup>a</sup>, which is suitably pivoted at its middle portion to the frame of the machine, and the rocking downward of the forward end of this lever 50<sup>a</sup> raises the rearward end and withdraws the same from contact with the drawer-latch 52 of the cash-drawer 51. The operating-handle is arrested in this downward position by the arrester-pawl 17<sup>b</sup>, as previously explained, the handle normally being drawn toward upward position by means of a spring 55, which is attached at its rearward end to the disk 17 and stretches over the flange 55<sup>a</sup> when the operating-handle 16 is moved to its lowest position. As soon as the cash-drawer is unlocked in the manner just explained it may be drawn out by hand, and in such outward movement the lug 53, formed upon the side of the drawer, strikes the lower end of the arrester-pawl 17<sup>b</sup> and releases the operating-handle 16, so that it may spring back to normal upward position, the length of the lug 53 being such that the pawl 17<sup>b</sup> will be held in releasing position by the lug long enough to allow the handle to resume its normal position before the drawer has passed, and then as soon as the handle has reached such normal position a lug 56, formed on the disk 17 at the upper end of the arrester-teeth 17<sup>a</sup>, strikes the upper end of the arrester-pawl 17<sup>b</sup> and holds the same rearward, so that the drawer may return to normal rearward position without occasioning the contact of the lug 53 with the lower end of the pawl 17<sup>b</sup> during such return movement of the drawer. During the continued movement of the handle 16 from its third position to its lowermost position provisions are made for disconnecting the link 40 from the disk 17, so that said disk may move on independently of the link 40 after the counter has once been thrown in. These provisions are shown in Figs. 5 and 5<sup>a</sup> and comprise a cam projection 127, formed on the side of the disk 17 and so situated that as soon as the counter-frame has been thrown into operative position upon the handle 16 reaching its third position the cam 127 forces the link 40 laterally and withdraws the pin 41 from the slot 42, so as to permit the continued movement of the disk 17 independently of the link 40, and as soon as the handle 16 returns to normal position the link 40 springs back to normal position with the pin 41 engaging the slot 42, as shown in Fig. 1. Of course while the setting-slides are being moved to set positions the handle 16 is at its third position and the counter-frame 49 is being held in operative position, as shown in Fig. 5. When, however, the handle 16 is moved after this positioning of the setting-slides, the above-described disconnecting of the pin 41 from the slot 42 permits the spring 49<sup>a</sup> to retract the counter-frame 49 to normal rearward position out of operative engagement.

The specific construction of the counter will now be described.

As previously stated, the various gear-wheels 72 of the counter are mounted loosely upon the transverse shaft 70, and each gear-wheel is fast to a disk 71, (see Fig. 7,) which disk bears on its periphery the usual numerals to show the amount of rotation of the wheel. Fast upon the shaft 69 and adjacent to the intermediate gear-wheels 44 are transfer-actuators 73, (see Fig. 8,) coöperating with which are transfer-pawls 74, there being two of these pawls for each wheel 44, since the said wheels 44 are twice the diameter of the counter-wheels 72, and therefore transfer twice for each single revolution. As shown in Fig. 7, the width of the gear-wheel 72 is double that of the gear-wheel 44, except for the gears at the left in said figure, these gears representing the units-adding wheel. The transfer-actuator 73 for transferring from the units-wheel to the tens-wheel, which is next to the right, is situated adjacent to the gear-wheel 44 of the tens-wheel, and the transfer-pawls 74, coöperating with this units-transfer actuator, have their pivotal connections extended laterally to bring the pawls into lateral alinement with this transfer-actuator 73 and also with the gear-wheel 72 of the tens counter-wheel. When the units-wheel has been rotated one complete revolution, (the corresponding gear-wheel 44 having in such cases been rotated ten teeth or one-half a revolution,) one of the pawls 74 is brought into the position shown in dotted lines in Fig. 8, and its inner surface then contacts with the transfer-actuator 73 and forces the pawl outward, so that its tooth 75 is carried into engagement with the gear-wheel 72 of the tens counter-wheel, this displaced position being shown in dotted lines in Fig. 8, and thus it will be seen that as the units-wheel makes a complete revolution the transfer-pawl 74 effects a transfer movement of one unit to the tens counter-wheel, and it is the feature of this particular mode of transfer that if the units-setting slide in this transfer movement has been moved too far, so as inadvertently to carry the units counter-wheel beyond the ten position when it should only have been moved to a less extent—such, for example, as to "9"—the setting-slide may be moved backward, and of course the backward movement of the gear 44 will move the transfer-pawl 74 backward and will thus reversely rotate the gear-wheel 72 of the tens-wheel, thus destroying the previous transfer and leaving the wheels in the position which they should assume. The transfer-pawls 74 are normally held out of operative position by means of a spring 76, which connects the two transfer-pawls of a single wheel. The same construction is used for the transfer between the wheels of the other denominations. Of course this transfer from the units-wheel to the tens-wheel must take place before the tens-wheel has been moved by its corresponding setting-slide; otherwise the setting-slide would be moved by the transfer. Therefore it is essential that the operator move first the units-slide, so that the transfer to the tens-wheel may take place before the tens-slide is moved, and then the tens-slide must be moved before the hundreds-slide, and so on, it being observed, of course, that when all of the slides are at normal zero position the respective gear-wheels 44 occupy the cut-away portions $9^a$ of the various gear-wheels 9, so that the wheels 44 may turn upon the transfer movement without affecting the wheels 9 and their respective key-slides, provided the slides are operated in proper order, as above stated.

As previously set forth, the gear-wheels 9 not only operate the gears 44, but they also operate the pinions 8 and 10; but, as stated herein, the fullest extent of movement of nine teeth of the gear 9 would not bring the cut-away portion $9^b$ into position opposite the pinion 8; but if it were desired to vary the positions of these relative pinions and still have the advantage of the cut-away portion $9^b$ these various gears might be arranged in the manner shown in Figs. $1^a$ and $1^b$, in which the gear-wheel 9 is made of double the width of the wheels 44 and 8, and the cut-away portion $9^b$ may be made on only one side of the gear-wheel 9, so that the other side presents a continuous set of teeth, in which case the gear-wheel 44 would operate on the same side of the gear-wheel 9 which contains the cut-away portion $9^b$, whereas the pinion 8 would operate upon the other side of the gear-wheel 9 containing the continuous set of teeth.

In order to reset the counter to zero, there is provided a knurled knob 78, (see Fig. 7,) which when rotated operates, through a cam portion 79, to shift the counter-shaft 70 laterally, and thereby bring the pins 81 into alinement with the pins 82, fast to the gear-wheel 72, so that the continued rotation of the shaft 70 will reset the counter to zero, whereupon the shaft 70 again shifts back to normal position with the various pins 81 out of alinement with the pins 82.

In Fig. 9 there has been shown a modified form of the construction of the transfer-pawls, comprising transfer-teeth 74', which slide in suitable radial grooves, so that the contact of these transfer-teeth with the transfer-actuator 73 will force the teeth outward in their radial grooves and effect the transfer in a manner similar to that described for the transfer by the pawls 74.

For the purpose of securing a printed record of the various detailed items the respective pinions 8, heretofore described, are connected, by means of nested sleeves 200, with corresponding type-wheels 201, (see Fig. 10,) these type-wheels having double sets of type on their periphery for a simultaneous printing of a check and a detail strip. The detail-strip is unwound from a supply-roller 202 and is wound upon a winding-roller 203, which latter is provided with a ratchet-wheel 204, engaged by the pawl 205 for advancing the strip at each operation of the machine. The check-strip is unwound from the supply-roller 206 and is led between feed-rollers 207 and 208 and thence between the knife-blades 209 to a position over the type-wheels 201, the upper knife-blade 209 being operated by any suitable means by the main operating elements. The check-platen 210 is pivoted at its middle portion to the side frame of the printing attachment, and its forward end is formed with a downwardly-extending foot 211. The detail-strip platen 212 is likewise pivoted at its middle portion and has an upwardly-extending foot 213. These two platens are normally drawn away from the type by means of a spring 214, attached between the forward ends of the platens. A lever 215, pivoted to the side frame of the machine at 216, carries at its upper end a pivoted wedge-shaped dog 217, which runs between the feet 211 and 213 of the aforesaid platens, and this dog is normally held retracted by a spring 218, so that the aforesaid feet engage the narrow neck of the dog. The lower end of the lever 215 is engaged by a pin 220, which is mounted upon a gear-wheel 221, which gear-wheel is given a rotary movement by means of a pinion 222, which is mounted upon the outer end of a collar to be later described, which collar rotates upon a shaft 223 and has fast to its inner end a gear-wheel 224 (see Fig.

11) of similar size to gear 222. This gear-wheel 224 is normally in alinement with rack-teeth 225, formed on the upper side of the cash-drawer 51. When the cash-drawer is pulled outward in the manner hitherto explained, the teeth 225 engage the pinion 224, and thereby rotate the aforesaid collar and also the gear 222 in the direction shown by the arrow in Fig. 10, and the extent of this rotation is such as to revolve the wheel 221 to such an extent that the pin 220 will operate the lever 215 to carry the lower portion thereof to extreme forward position, thereby carrying rearward the dog 217 and forcing the platens 210 and 212 against the type-wheels on opposite sides thereof, so as to take an impression on both the check and the detail-strip, and on the return movement of the drawer the gear-wheels 222 and 221 rotate reversely, carrying the lever 215 back to normal position. This forward-and-rearward movement of the lever 215 operates the aforesaid pawl 205 to advance the detail-strip a certain extent at each operation and also operates a pawl 225, which engages a ratchet-wheel 226 for advancing the ink-ribbon 227, which inks the type-wheels 201. In order to provide for the feed of the check-strip, a gear-wheel 230 is provided, which meshes with the aforesaid gear-wheel 222, and side by side with the gear-wheel 230 is a companion gear-wheel of similar size and diameter, which meshes with another gear-wheel, 231, which latter in turn meshes with a gear-wheel 232, fast to the feed-roller 207. Any suitable form of clutch mechanism may be utilized between the gear-wheel 230 and its companion gear-wheel—such that the rotation of the gear-wheel 222 in the direction shown by its arrow in Fig. 10 will not cause the rotation of the gear-wheel 231; but upon the closing movement of the drawer the rotation of the gear-wheel 222 in the opposite direction will also cause the rotation of the gear-wheel 231 in the direction shown by the arrow and will thus rotate the gear-wheel 232 in the direction shown by its arrow, and thus feed the check forward a certain extent.

As it may sometimes be desirable to open the cash-drawer independently of the operation of the machine, an auxiliary latch-releasing device is provided, as shown in Fig. 11. This device comprises a hand-operable lever 240, suitably pivoted at its middle portion to the side frame of the machine, and the rearward portion of this lever engages a lever 241, pivoted at its middle portion 242 in the rear of the cash-drawer 51. The right-hand end of the lever 242 normally rests upon a pin 243, which projects rearwardly from the aforesaid latch 52. (See also Fig. 1.) The left-hand end of the lever 241 has a downwardly-extending portion 244, as shown in Fig. 15. It will thus be apparent that when the lever 240 is moved into the position shown in dotted lines in Fig. 11 the rearward end of said lever will operate upon the inclined portion 244 of the lever 241, and consequently raise that end of the lever 241 and depress the right-hand end of said lever, thereby depressing the pin 243 and also depressing the latch 52 out of engagement with the previously-described retaining-lever 50. The cash-drawer 51 may then be withdrawn by hand without the attendant operation of the machine. However, since it is the cash-drawer which operates the printing mechanism by means of the previously-described rack 225 engaging the pinion 224, the same hand-lever 240 is arranged to displace the gear 244 from alinement with the rack 225 whenever the lever 24 is operated to release the cash-drawer in the manner just described. The aforesaid gears 222 and 224 are mounted upon the opposite ends of a collar 250, which is mounted to rotate upon the shaft 223. The lever 240 is formed with a slot 251, in which plays a pin 252, attached to a sleeve 253, which surrounds the collar 250, this sleeve 253 being formed with a flange 254, which fits in an annular groove formed in the collar 250, so that the lateral movements of the sleeve 253 will carry with it a collar 250; but rotation of the collar 250 may be permitted independently of the sleeve 253. Now when the lever 240 is operated to release the drawer in the manner described the entire sleeve 253 is shifted to the right, thereby carrying the collar 250 and its gear 224 into position shown in dotted lines in Fig. 11, in which it is out of alinement with the rack 225, so that when the cash-drawer is opened the printing mechanism will not be operated, and in such lateral shifting movement of the collar 250 the width of the gear 222 is such that it is not withdrawn from engagement with its coacting gears 221 and 230, Fig. 10. In order to effect an automatic return of the lever 240 to normal position, and thus leave the machine ready to have the printing mechanism operated by the drawer upon the next normal operation of the machine, the sleeve 253 has fast upon it a downwardly-extending projection 261, the cross-sectional shape of which is shown in Figs. 13 and 14. Attached to the cash-drawer 51 is a slide 262, guided by pins 263 and having an upwardly-extending projection 264, the slide being normally drawn to the right by means of the spring 265. When the lever 240 is pushed inward in the manner previously described, the projection 261 is brought into alinement with the projection 264, so that upon the opening movement of the drawer said projection 264 strikes the left-hand surface of the projection 261, but is carried around outside of this surface, as shown in Fig. 13, this movement being permitted under the tension of the spring 265. When, however, the projection 264 has been drawn past the projection 261 and the drawer is started inward, the projection 264 now strikes the straight inclined surface of the projection 261, and since the slide 262 is now at the limit of its right-hand position, as shown in Fig. 14, the projection 264 pushes against the projection 261 and forces the sleeve 253, together with the lever 240, back to normal position, thus carrying the collar 250 and the gear 224 into normal alinement with the rack 225, and of course when the cash-drawer is operated without the previous operation of the lever 240 the projection 264 clears the projection 261 both on the outward and inward movement of the cash-drawer, and the rack 225 rotates the gear 224 and through the collar 250 rotates the gear 222 to operate the printing mechanism in the manner previously described. The return movement of the drawer is effected by means of springs 266.

While the form of mechanism here shown and described is admirably adapted to fulfil the objects primarily stated, it is to be understood that it is not desired to confine the invention to the one form of embodiment here disclosed, for it is susceptible of embodiment in various forms, all coming within the scope of the claims which follow.

Having thus described my invention, what I claim, and desire to secure by Letters Patent, is—

1. In a cash-register, the combination with a normally unlocked operating member, of means for locking said member at an intermediate portion of its stroke; and means controlled by the insertion of a check into the machine for releasing said locking means.

2. In a cash-register, the combination with an operating member, of a series of differentially-adjustable setting elements; means for locking said member when it has been moved to a certain intermediate position in its stroke; means for locking said setting elements when said operating member is in its normal position, with provisions for releasing said elements when the member is moved to said intermediate position; and means controlled by the insertion of a check into the machine for releasing said locking means for the operating member.

3. In a cash-register, the combination with an operating member, of a series of differentially-adjustable setting elements; means for locking said elements in adjusted positions; spring actuating means common to all of said setting elements for returning the same to normal position; and means controlled by said operating member for unlocking said setting elements and for releasing said spring returning means to cause the latter to return said elements to normal position.

4. In a cash-register, the combination with a series of differentially-adjustable setting elements, of an automatic returning device common to all of said elements for returning said elements to normal position, said setting device being displaced by the adjustment of any one of said elements; means for latching said returning device in displaced position; and means for releasing said returning device to permit the same to return the setting elements to normal position.

5. In a cash-register, the combination with an operating member, of a series of differentially-adjustable setting elements; a common spring returning member for returning said elements to normal position, said member being displaced by the adjustment of any one of said elements; means for latching said returning member in displaced position; and means controlled by said operating member for releasing said latching means.

6. In a cash-register, the combination with an operating-handle, of a series of adjustable setting-slides; a spring-actuated returning device common to said slides; connections intermediate said slides and said returning device for displacing the latter against its spring tension by the adjustment of said slides from normal position; a latch-pawl for holding the returning device in displaced position; and means connected with the operating-handle for tripping said latch-pawl to permit the returning device to return to normal position carrying with it said setting-slides.

7. In a cash-register, the combination with an operating member, of a series of differentially-adjustable setting elements; an automatic returning device common to all of said elements for returning the latter to normal position; means for locking the operating member at an intermediate portion of its stroke; means for locking said setting elements when said operating member is in its normal position, with provisions for unlocking said elements when said member is moved from its normal position; means for latching said returning device in displaced position; and means for releasing said returning device to return the setting elements to normal position during the movement of said operating member from its normal position to the said locked intermediate position.

8. In a cash-register, the combination with an operating member, of a series of differentially-adjustable setting elements; an automatic returning device common to all of said elements for returning the latter to normal position; means for locking the operating member at an intermediate portion of its stroke; means for locking said setting elements when said operating member is in its normal position, with provisions for unlocking said elements when said member is moved from its normal position; means for latching said returning device in displaced position; means for releasing said returning device to return the setting elements to normal position during the movement of said operating member from its normal position to the said locked intermediate position; and means controlled by the insertion of a check into the machine for unlocking the operating member at said intermediate locking position.

9. In a cash-register, the combination with an operating member, of a series of differentially-adjustable setting elements; an automatic returning device for returning all of said elements to normal position; locking means for locking the operating member at an intermediate portion of its stroke; means for effecting the return of the setting elements to normal position by said returning device while the operating member is moving from normal position to said locked intermediate position; means for locking said operating member at a second intermediate position in advance of the first-mentioned intermediate position; and means controlled by the displacement of any one of said setting elements from normal position for releasing the lock for the second intermediate position of the said operating member.

10. In a cash-register, the combination with an operating member; of a series of differentially-adjustable setting elements; an automatic returning device for returning all of said elements to normal position; locking means for locking the operating member at an intermediate portion of its stroke; means for effecting the return of the setting elements to normal position by said returning device while the operating member is moving from normal position to said locked intermediate position; means for locking said operating member at a second intermediate position in advance of the first-mentioned intermediate position; means controlled by the displacement of any one of said setting elements from normal position for releasing the lock for the second intermediate position of the said operating member; a counter; and means for throwing the counter into operative relation with said setting elements during the movement of said operating member from its first intermediate position to its second intermediate position.

11. In a cash-register, the combination with an operating-handle, of a series of adjustable setting-slides; a spring returning device common to said slides for returning the same to normal position; means for latching said returning device in displaced position; means for locking the operating-handle at an intermediate portion of its stroke, and means for releasing said lock; means for releasing said returning device during the movement of said handle from normal position to its intermediate locked position; a locking projection connected with the operating-handle for locking the latter in a second intermediate position of its stroke; and a locking-frame cooperating with said locking projection for locking the handle at said second position, said frame being common to said setting-slides and displaced by any one of the same to unlock the handle from its second intermediate position.

12. In a cash-register, the combination with an operating-handle and a cash-drawer, of means for locking the handle at an intermediate portion of its stroke; means for unlatching the drawer by the movement of the handle from normal position to said intermediate position; and means operated by the cash-drawer for releasing said lock for the handle to permit the same to return to normal position.

13. In a cash-register, the combination with an operating-handle and a cash-drawer, of a spring for normally holding the operating-handle in normal position; a pawl cooperating with said handle for holding the same latched at an intermediate portion of its stroke; a projection formed on the cash-drawer for operating said pawl to release the handle and permit the same to return to normal position; and a second projection connected with said operating-handle for engaging said pawl when the handle is in normal position and holding said pawl out of cooperative position with relation to the aforesaid projection formed on the cash-drawer 14. In a cash-register, the combination with an operating-handle and a cash-drawer, of a spring for normally holding the operating-handle in normal position; a pawl cooperating with said handle for holding the same latched at an intermediate portion of its stroke; a projection formed on the cash-drawer for operating said pawl to release the handle and permit the same to return to normal position; a second projection connected with said operating-handle for disengaging said pawl when the handle is in normal position and holding said pawl out of cooperative position with relation to the aforesaid projection formed on the cash-drawer; a latch for holding the drawer closed; and means connected with said operating-handle for operating said latch during the movement of said handle from normal position to its intermediate latched position.

15. In a cash-register, the combination with an operating-handle, a series of differentially-adjustable setting elements, and a counter mounted in a movable frame; of connecting-gears intermediate said setting elements and said counter; an operating-plate connected with said operating-handle; and a connecting-bar between said counter-frame and said operating-plate for effecting the engagement between the counter and the aforesaid connecting-gears, said connecting-bar being provided with a pin engaging a slot formed in said operating-plate.

16. In a cash-register, the combination with an operating-handle, a series of differentially-adjustable setting elements, and a counter mounted in a movable frame; of connecting-gears intermediate said setting elements and said counter; an operating-plate connected with said operating-handle; a connecting-bar between said counter-frame and said operating-plate for effecting the engagement between the counter and the aforesaid connecting-gears, said connecting-bar being provided with a pin engaging a slot formed in said operating-plate; and means for disconnecting said pin from said slot at a certain intermediate portion of the stroke of said operating-handle to permit the continued movement of said handle independently of the movement of the counter-frame.

17. In a cash-register, the combination with a series of differentially-adjustable setting elements, of a counter; connections between the counter and said setting elements whereby the former is operated directly by the movements of the latter; and transfer elements between the adjacent counter-wheels operable directly upon said counter-wheels to turn the latter forward or reversely according to the adjustment of the setting element of the respective next lower order of denomination.

18. In a cash-register, the combination with a series of differentially-adjustable setting elements, of a counter mounted in a movable frame; operating connections between the counter and said elements for moving the former directly by the adjusting movements of the latter; means for moving the counter-frame to carry the counter into engagement with said operating connections; and transfer elements between the adjacent counter-wheels operable directly upon said counter-wheels to turn the latter forward or reversely according to the adjustment of the setting element of the respective next lower order of denomination.

19. In a cash-register, the combination with a series of differentially-adjustable setting elements, of a counter; a series of intermediate gears for engaging the counter-wheels and transmitting thereto the adjusting movements of said elements; and transfer-pawls carried by said intermediate gears, with means for causing the engagement of said pawls with the respective counter-wheels of next higher denomination when said intermediate gears pass the transferring position in either direction of movement of the gears.

20. In a cash-register, the combination with a series of differentially-adjustable setting elements, of a counter; a series of intermediate gears for engaging the counter-wheels and transmitting thereto the adjusting movements of said elements; transfer-pawls pivoted upon said intermediate gears and positioned respectively for engagement with the counter-wheels of next higher denomination; and stationary cam projections coöperating with said transfer-pawls to force the latter into transferring position to operate upon said counter-wheels to turn the same forward or reversely at the point of transfer according to the direction of movement of said intermediate gears.

21. In a cash-register, the combination with a series of setting elements and a printing mechanism coöperating therewith, of a cash-drawer; means for operating the printing mechanism by the movement of the cash-drawer; and devices for disabling said drawer operative means whereby the movement of the drawer will not operate the printing mechanism.

22. In a cash-register, the combination with a series of setting elements, type-carriers controlled thereby, a platen, a paper-feeding device, a cash-drawer, and operating connections between said cash-drawer and the platen and the feeding device; of means for destroying the operative alinement of said operating connections at will to prevent the operation of the platen and the feeding device by the movement of the cash-drawer.

23. In a cash-register, the combination with a series of setting elements and a printing mechanism coöperating therewith, of a cash-drawer; means for operating the printing mechanism by the movement of the cash-drawer; devices for disabling said drawer operative means whereby the movement of the drawer will not operate the printing mechanism; and means for automatically enabling said drawer operative means at each operation of the machine.

24. In a cash-register, the combination with a series of setting elements and a printing mechanism coöperating therewith, of a cash-drawer; means for operating the printing mechanism by the movement of the cash-drawer; devices for disabling said drawer operative means whereby the movement of the drawer will not operate the printing mechanism; and means operated by the cash-drawer for automatically enabling said drawer operative means at each operation of the machine.

25. In a cash-register, the combination with an operating-handle, a series of setting elements, type-carriers controlled by said setting elements, a platen for said type-carriers, a cash-drawer, and a latch for said cash-drawer operated by said operating-handle; of means controlled by said cash-drawer for operating said platen by the movement of the drawer; and an auxiliary device for releasing said cash-drawer independently of said operating-handle and for simultaneously preventing the operation of the platen by the ensuing movement of the cash-drawer.

26. In a cash-register, the combination with an operating-handle, a series of setting elements, type-carriers controlled by said setting elements, a platen for said type-carriers, a cash-drawer, and a latch for said cash-drawer operated by said operating-handle; of means controlled by said cash-drawer for operating said platen by the movement of the drawer; an auxiliary device for releasing said cash-drawer independently of said operating-handle and for simultaneously preventing the operation of the platen by the ensuing movement of the cash-drawer; and means controlled by the cash-drawer for restoring said auxiliary device to normal position to permit the operation of the platen by the cash-drawer upon the next successive normal operation of the machine.

27. In a cash-register, the combination with a series of setting elements, and a printing mechanism coöperating therewith, of a cash-drawer and an operating-rack connected therewith; a gear-wheel for operating said printing mechanism and normally arranged in coöperative alinement with said operating-rack; and means for shifting the relative positions of said rack and said gear to destroy the coöperative alinement of the same and thereby prevent the operation of the printing mechanism by the movement of the cash-drawer.

28. In a cash-register, the combination with a series of setting elements, and a printing mechanism coöperating therewith, of a cash-drawer and an operating-rack connected therewith; a gear-wheel for operating said printing mechanism and normally arranged in coöperative alinement with said operating-rack; means for shifting the relative positions of said rack and said gear to destroy the coöperative alinement of the same and thereby prevent the operation of the printing mechanism by the movement of the cash-drawer; and means connected with the cash-drawer for automatically restoring the coöperative alinement of said rack and said gear.

29. In a cash-register, the combination with a series of setting elements and a printing mechanism coöperating therewith, of a cash-drawer having an operating-rack; a gear-wheel for operating said printing mechanism and normally arranged in coöperative alinement with said rack; a shifting member connected with said gear; means for shifting the latter member to displace said gear out of coöperative alinement with said rack; a restoring projection formed on said shifting member; and a spring-pressed projection connected with said cash-drawer for coöperating with said restoring projection to be displaced by the latter during one direction of movement of the drawer, but in the opposite direction of movement of the drawer to shift said restoring projection to carry said shifting member back to normal position.

30. In a cash-register, the combination with a series of setting elements and a printing mechanism coöperating therewith, of a cash-drawer having an operating-rack; a gear-wheel for operating said printing mechanism and normally arranged in coöperative alinement with said rack; a shifting member connected with said gear-wheel; a latch for the cash-drawer; a hand-operative device for releasing said latch and for adjusting said shifting member to move said printer-operating gear-wheel out of alinement with its operating-rack; a restoring projection formed on said shifting member; and a spring-pressed projection connected with said cash-drawer for coöperating with said restoring projection to be displaced by the latter during one direction of movement of the drawer, but in the opposite direction of movement of the drawer to shift said restoring projection to carry said shifting member back to normal position.

31. In a cash-register, the combination with an operating member, a series of keys, and a series of type-carriers controlled by said keys bearing duplicate characters for printing on opposite sides of said carriers, of two platens for engaging the respective opposite sides of said type-carriers, said platens having operating extensions contiguously placed; a wedge-shaped operating device; and means connected with said operating member for forcing said wedge-shaped device between the operating extensions of said platens and thereby forcing the latter against the opposite sides of the type-carriers to take a double impression therefrom.

In witness whereof I have hereunto set my hand in presence of two witnesses.

CARL LAURICK.

Witnesses:
 WOLDEMAR HAUPT,
 HENRY HASPER.